United States Patent
Schlicht

[11] 3,779,928
[45] Dec. 18, 1973

[54] AUTOMATIC TRANSMISSION FLUID
[75] Inventor: Raymond C. Schlicht, Fishkill, N.Y.
[73] Assignee: Texaco Inc., New York, N.Y.
[22] Filed: Apr. 1, 1969
[21] Appl. No.: 812,410

[52] U.S. Cl.................. 252/75, 252/32.5, 252/32.7, 252/77
[51] Int. Cl............................................ C09k 3/00
[58] Field of Search ............... 252/75, 76, 77, 32.7, 252/49.8, 49.9; 260/934

[56] References Cited
UNITED STATES PATENTS

| | | | |
|---|---|---|---|
| 3,156,653 | 11/1964 | Foehr | 252/78 |
| 3,446,737 | 5/1969 | Panzer et al. | 252/75 X |
| 3,278,550 | 10/1966 | Norman et al. | 260/326.3 |
| 2,344,395 | 3/1944 | Cook et al. | 252/32.7 E |
| 2,858,332 | 10/1958 | Watson et al. | 252/75 X |
| 3,131,150 | 4/1964 | Stuart et al. | 252/51.5 X |
| 3,175,976 | 3/1965 | Foehr | 252/75 |
| 3,259,579 | 7/1966 | Rogers et al. | 252/75 X |
| 3,490,737 | 1/1970 | Gieseking et al. | 252/75 X |

FOREIGN PATENTS OR APPLICATIONS 534,385   12/1956   Canada............................ 252/49.8

OTHER PUBLICATIONS

"Petroleum Refiner," Process Handbook, Ed., 9/1948, Sec. 2, Gulf Publ. Co., Houston, Tex., pgs. 186, 198, 210, 230, 238.
"Acyclic Hydrocarbons" Naming & Indexing of Chemical Cpds., Chem. Abstr. (1962), pg. 16N Primary Examiner—Leon D. Rosdol
Assistant Examiner—Harris A. Pitlick
Attorney—K. E. Kavanagh and Thomas H. Whaley

[57] ABSTRACT

Automatic transmission fluid comprising at least 86 weight percent of a mineral lubricating oil and 0.01 to 5.0 weight percent of an alkanephosphonic acid salt represented by the formula:

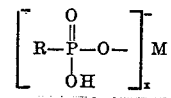

in which R is a straight chain or predominantly straight chain aliphatic radical having from about 11 to 40 carbon atoms, M is zinc, calcium or an alkyl ammonium radical having the formula:

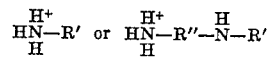

in which R" is a polymethylene radical having from two to four carbon atoms, R' is an alkyl radical having from six to 20 carbon atoms and $x$ is 1 or 2 equal to the valence of M, and a method for operating an automatic transmission.

9 Claims, No Drawings

AUTOMATIC TRANSMISSION FLUID

This invention relates to a mineral lubricating oil composition particularly adapted for use in an automatic transmission or a motor vehicle and to a method of operating an automatic transmission.

An automatic transmission is a complex hydraulic mechanism which incorporates the functions of a torque converter, wet clutches and planetary gearing in a relatively compact sealed unit. This device requires a transmission fluid which provides lubricity, extreme pressure properties and carefully selected frictional properties. The fluid must not be corrosive to copper alloys or in any way deleterious to the synthetic seals in the transmission. An important requirement for the fluid is that it maintain good lubricity and friction modifying properties under the prolonged high-shear, high temperature conditions encountered in this environment.

Carboxylic acids or their derivatives have been the principal lubricity agents or friction modifiers employed in automatic transmission fluids. These additives provide commercial automatic transmission fluids having a useful service life. The fluids, however, are definitely limited in their stability which directly reduces their useful life. This is indicated by a rising coefficient friction in the fluid and by the early onset of erratic or harsh shifting in service and in automatic transmission tests. Automobile manufacturers and lubricating oil formulators have been particularly interested in trying to overcome the unsatisfactory properties of current automatic transmission fluids.

Improved automatic transmission fluid compositions based on the use of certain n-alkanephosphonic acids have recently been discovered and are the subject of a commonly assigned application, Ser. No. 778,335, filed Nov. 22, 1968 and now abandoned. The present invention is a further related discovery in automatic transmission fluids. The use of phosphorus-containing acids and salts in general lubricating oil compositions is disclosed in U.S. Pat. No. 2,382,043 (1945).

A novel lubricating oil composition has now been discovered having good stability and outstanding friction modifying properties resulting in smooth shifting characteristics for surprisingly long service periods in automatic transmissions.

In accordance with this invention, there is provided an automatic transmission fluid comprising at least 86 weight percent of a mineral lubricating oil and from about 0.01 to 5.0 percent by weight of an alkanephosphonic acid salt represented by the formula:

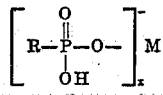

in which R is a straight chain aliphatic radical or a predominantly straight chain aliphatic radical having from about 11 to 40 carbon atoms, M is zinc, calcium or an alkyl ammonium radical having the formula:

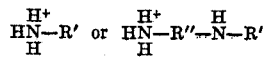

in which R'' is a polymethylene radical having from two to four carbon atoms, R' is an alkyl radical having from six to 20 carbon atoms and x is 1 or 2 equal to the value of M. The fluid of the invention also provides a novel method of operating an automatic transmission mechanism. The fluid is surprisingly effective in automatic transmission service which is attributed to the discovery of a specific or critical class of alkanephosphonic acid salts which impart outstanding lubricity and friction stable properties to the lubricating oil composition. The automatic transmission fluid of the invention will generally be a fully formulated fluid containing minor amounts of conventional additives. For example, the automatic transmission fluid can contain from about 0.5 to 8.0 weight percent of a polymer of mixed alkyl esters of methacrylic acid having above 25,000 molecular weight, 0.25 to 5.0 weight percent of a reaction product of a polyalkylene polyamine and an alkenyl succinic acid, 0.1 to 5 weight percent of a zinc dialkylphenoxyalkyl dithiophosphate and from about 0.1 to 2.5 weight percent of an aryl-substituted alpha naphthylamine. The automatic transmission fluid of the invention is generally characterized by an SUS viscosity at 210°F. of 49 to 60, a viscosity index of at least 150 and a pour point below −40°F. and meets the essential DEXRON specifications set by General Motors for automatic transmission fluids.

There is criticality in the principal lubricity additive component employed in the automatic transmission fluids of this invention. This criticality has been found in the nature of the cation portion of the salt as well as in the structure of the alkyl radical attached to the phosphorus atom. Most importantly, only zinc, calcium, and amine type salts have been found to be effective in the present invention while magnesium salts are ineffective or undesirably pro-fictional during the period of clutch engagement.

The mineral lubricating oil which constitutes at least 86 weight percent of the composition of the invention is a refined oil or a mixture of refined oils selected according to the viscosity requirements of the particular service. For automatic transmissions where the requirements include an SUS viscosity of the compounded oil at 210°F. of 49 minimum up to 60 and at 0°F. of 7,000 maximum (extrapolated), the base oil or the major component thereof is generally a distillate oil lighter than SAE-10 grade motor oil, such as one having an SUS viscosity at 100°F. less than 150 and generally between about 50 and 125. The distillate fraction can be a refined paraffinic distillate, a refined naphthenic distillate or a combination thereof. The flash point of the distillate component of the base oil will generally be substantially above 300°F.; if the distillate fraction constitutes the entire base oil, its flash point will usually be above 375°F.

A particularly preferred base oil comprises approximately 70 to 95 percent of a refined distillate oil and 5 to 30 percent of a refined residual fraction which imparts desired high flash point and lubricity to the base oil. A particularly preferred residual fraction comprises a paraffin base residuum which has been propane deasphalted and subjected to centrifuge dewaxing and which has an SUS at 210°F. below about 250. An effective base oil mixture comprises 68 percent of a furfural refined, acid treated, clay contacted, solvent-dewaxed, paraffin base distillate having an SUS at 100°F. of 100, a viscosity index about 100, a flash above 385°F. and a pour below about +10°F., 22 percent of an acid-treated naphthenic base distillate having an SUS at 100°F. of 60, a flash above 300°F., and a pour below −40°F., and 10 percent of a paraffin base residuum which has been propane deasphalted, centrifuged-dewaxed, and clay-contacted, and has an SUS viscosity at 210°F. of about 160, a flash above 530°. and a pour of +5°F.

The alkanephosphonic acid salt additive of the invention is represented by the formula:

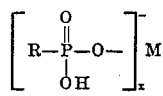

in which R is a straight chain aliphatic radical or a predominantly straight chain aliphatic radical having from about 11 to 40 carbon atoms, M is zinc, calcium or an alkyl ammonium radical having the formula:

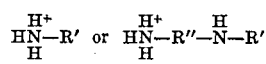

in which R'' is a polymethylene radical having from two to four carbon atoms, R' is an alkyl radical having from six to 20 carbon atoms and $x$ is 1 or 2 equal to the valence of M. The structure of the alkane radical attached to the phosphorus atom in the alkanephosphonic acid salt is critical. A highly branched alkane radical attached to the phosphorus atom tends to produce an ineffective additive. By a predominantly straight chain aliphatic radical in this position is meant one in which at least 75 percent and preferably 80 percent of the carbon atoms are in a single straight chain. The phosphonic acid function may reside on either a terminal or internal carbon atom of this alkyl radical. A preferred class of the alkanephosphonic acids from which to prepare the salt are those in which the alkyl radical attached to the phosphorus atom is a straight chain radical having from 12 to 18 carbon atoms and a more particularly preferred class because of the quality and durability of their anti-frictional effect are those in which this radical has from 12 to 14 carbon atoms. A surprising feature of the alkanephosphonic acid salts of the invention is that a mineral oil containing same exhibits a marked reduction in friction between transmission clutch plates as the sliding speed approaches zero, a highly desirable feature for an automatic transmission fluid not possessed by the analogous n-alkane carboxylic acid type additives.

A satisfactory method for preparing the salts of the alkanephosphonic acid is by reacting a suitable olefin with a phosphite, such as dimethyl phosphite. The olefin and phosphite are combined at room temperature and are heated up to 115 to 175°C. under a nitrogen atmosphere. An initiator, such as ditertiary butyl peroxide, is added and the mixture heated at a temperature in the range of 130 – 175°C. generally for a period from 2 to 6 hours. The ester reaction product is treated with aqueous hydrochloric acid and the acid product extracted with diethyl ether (toluene, or other suitable organic solvent) water washed, dried by benzene-azeotroping and reacted with an amine or zinc oxide or hydroxide to form the salt. The alkanephosphonic acid salts prepared by this procedure are largely of the preferred structure although they may also contain minor amounts of telo-mers possessing two or more alkane groups coupled together with only one linked directly to the phosphorus atom.

The following examples give the details of preparation of salts of alkanephosphonic acids within this invention as well as a salt used for comparative purposes.

EXAMPLE I

Zinc salt of n-octadecanephosphonic acid

An n-octadecanephosphonic acid has been prepared by the process described above from commercial octadecene-1. The resultant acid analyzed 7.8 percent phosphorus (9.3 percent calculated for the pure compound) and had a Neutralization No. = 189 (mg. KOH/g sample). Sixty seven g. (0.2 mole) of the acid was dissolved in 300 ml. benzene and a paste of 10 g. zinc oxide (0.12 mole) in 20 ml. water was stirred into the benzene solution. The mixture was azeotroped free of water by refluxing up to 164°F. maximum, removing water via a Dean-Stark trap.

Then approximately 80 ml. n-butanol was added to solubilize the zinc salt. The unreacted zinc oxide was filtered off, and the filtrate was solvent-stripped up to 220°F./0.1 mm. The 67 g. of waxy product analyzed 7.7 percent phosphorus and 5.29 percent zinc (vs. 7.2 and 7.6 percent respectively calculated).

EXAMPLE II

Magnesium salt of n-octadecanephosphonic acid

A paste of 8 g. $Mg(OH)_2$ (0.14 mole) in 10 ml. water was placed in a reaction flask, and a solution of 101 g. octadecanephosphonic acid (approx. 0.25 mole) in 300 ml. xylene was added with stirring. The mixture was refluxed one half hour at 195°F. and then azeotroped free of water up to 278°F. max. The xylene solution was solvent-stripped up to 250°F. at approximately 20 mm. Then 100 g. of a hydrorefined diluent oil was admixed with the 101 g. of the magnesium salt. The resultant oil concentrate analyzed for 1.46% Mg and 3.5 percent phosphorus (vs. 1.46 and 3.73, respectively calculated).

EXAMPLE III

Zinc salt of n-tetradecanephosphonic acid

An n-tetradecanephosphonic acid was prepared from commercial tetradecene-1 by dimethylphosphite addition and hydrolysis. The resultant acid analyzed 8.7 percent phosphorus (11.1 calculated for the pure acid) and had a Neutralization No. = 199.

A 150 g. (0.42 mole) quantity of the acid was dissolved in 300 ml. benzene and added with stirring to a paste of 41 g. zinc oxide (0.5+ mole) in 30 ml. water. After 1 hour stirring at 70°C. and several hours at reflux, 200 ml. each of toluene and methylethanol was added. Benzene was distilled out, and the mixture refluxed at greater than 100°C. to effect the elimination of the water. Finally 200 ml. xylene was added and the mixture filtered at 115°C. Solvent-stripping to 113°C. at 12 mm. gave 165 g. waxy product. The product analyzed for 8.4 percent phosphorus and 7.9 percent zinc (vs. 8.0 and 8.55 percent, respectively calculated).

EXAMPLE IV

Complexation Product of a Zinc n-tetradecane phosphonate and an alkenylsuccinimide For purposes of rendering the blending into oil of the zinc salt of Example III more convenient, 39 g. of the zinc salt was added to 250 g. of a 50 percent active oil concentrate of an alkenylsuccinimide derived from the reaction of tetraethylenepentamine with an approximately 1,200 mole wt. polybutene/maleic anhydride reaction product. The mixture was dehydrated by toluene azeotroping. The solvent-stripped product analyzed 1.1 percent zinc, 1.07 percent phosphorous, and 1.5 percent nitrogen vs. 1.14, 1.08, and 1.2 percent respectively calculated.

A number of amine salts of n-alkanephosphonic acid were prepared in situ during the blending of test oils by adding the appropriate quantities of amine and acid directly to the oil. Examples V and VI illustrate the manner of preparation.

| Ex. | n-alkanephosphonic acid | Amine | Parts by wt. Acid:Amine |
|---|---|---|---|
| V | n-tetradecane phosphonic acid | N-n-C$_{18}$-alkyl-propane-1,3-diamine | 0.1 : 0.12 |
| VI | n-octadecanephosphonic acid | N-n-C$_{18}$-alkyl-propane-1,3-diamine | 0.12 : 0.12 |

Examples VII and VIII below, illustrate the preparation of amine salts of alkanephosphonic acids as additive concentrates prior to their blending into lubricating oil compositions.

EXAMPLE VII

Amine salt of n-octadecanephosphonic acid

A mixture of 20 g. n-octadecanephosphonic acid (0.06 mole) and 280 g. ( 0.06 mole) of an approximately 50 percent oil concentrate of an alkenylsuccinamic acid of tetraethylenepentamine (where the alkenyl group is derived from an approximately 1,200 molecular weight polybutene) was heated at 140–150°F. for one-fourth hour to dissolve the phosphonic acid and form a salt of the polyamine compound. The fluid product analyzed for 0.56 percent phosphorus and 1.44 percent nitrogen (vs. 0.52 and approximately 1.44 percent calculated).

EXAMPLE VIII

A mixture of 100 g. n-octadecanephosphonic acid (approximately 0.33 mole) and 84 g. of a commercial nitrogeneous ashless detergent (OS-16589 B) was stirred near room temperature the acid dissolving with assistance of the slight heat of neutralization involved. The analyses were 4.0 percent phosphorus and 3.8 percent nitrogen (vs. 4.25 and 3.5 percent calculated).

Another technique of preparing oil-dispersible salts of n-alkanephosphonic acids involved the neutralization, at least partially, of the dispersed base in an over-based metal detergent additive by the alkanephosphonic acid. The following example illustrates the use of a detergent containing calcium carbonate dispersed in an n-calcium sulfonate to prepare a fluid, transparent dispersion of the n-calcium alkanephosphonate.

EXAMPLE IX

A 1.5 g. ( 9.005 mole) quantity of an n-tetradecanephosphonic acid preparation was added at 170°F. to 28 g. of an alkaline detergent additive composed of an oil concentrate of a dispersion of about 1.5 moles CaCO$_3$ per mole of a calcium salt of a sulfonated petroleum fraction. Its analyses were 4.8% Ca and 2.9% CO$_2$. The mixture was heated to 250°F., diluted by benzene, filtered to remove trace in solubles, and then solvent-stripped to 150°F. at 30 mm. The clear fluid product analyzed for 4.4% Ca and 0.67 percent phosphorus vs. 4.6 and 0.50 percent, respectively calculated. A blend of this additive at 4.0 percent wt. in a paraffin base mineral oil having an SUS at 100°F. of 325–350°F. provided 0.21 percent wt. of the calcium n-tetradecanephosphonate. The Low Velocity Friction test results on this oil were (in coefficients of friction) 0.142 at 40 ft./min. sliding speed and 0.121 at 1.0 ft./min., illustrating that the desired reduction of friction occurred as sliding speeds decreased.

Examples of effective zinc, calcium and ammonium alkanephosphonate salts are n-dodecanephosphonic, n-tetradecanephosphonic, n-hexadecanephosphonic, n-octadecanephosphonic, and n-eicosanephosphonic acid salts of zinc, calcium and of such amines as N-M-C$_{18}$-alkyl-propane-1,3-diamine, its n-C$_{12}$ analog, various commercial mixed N-alkylpropane-1,3-diamines, and primary, secondary or tertiary mono-amines bearing at least one C$_{12}$ or higher alkyl group such as n-1-dodecylamine, n-2-dodecylamine, didodecylamine, etc.

A relatively minor amount of the alkanephosphonic acid salt in a suitable lubricating oil is effective to provide an outstanding automatic transmission fluid. Generally, the salt is employed in the transmission fluid in an amount ranging from about 0.01 to 5.0 percent by weight with the preferred concentration being from 0.05 to 0.5 weight percent.

Viscosity index improvement of the fully formulated automatic transmission fluid of the invention is effected with a methacrylate ester polymer having the formula:

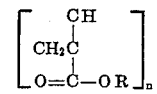

wherein R is an alkyl group, a dialkyl aminoalkyl group or a mixture of such groups containing from one to 20 carbon atoms and $n$ is a number providing a molecular weight of the polymer in the range from 25,000 to 1,250,000 and preferably from 35,000 to 200,000. Various methacrylate ester polymers of this type are known which possess pour depressant and viscosity index improving properties. A very effective material of this type is a copolymer of the lower C$_4$–C$_{14}$ alkyl methacrylate esters. A commercial methacrylate copolymer of this type which is primarily a viscosity index improver corresponds to the formula in which R represents about 32 percent lauryl, 28 percent butyl, 26 percent stearyl and 14 percent hexyl groups and having a molecular weight above 50,000. The methacrylate ester copolymer is employed in the base oil in a proportion ranging from about 0.5 to 10 percent by weight preferably from 1.0 to 5.0 weight percent based upon the oil composition in order to impart the desired viscosity, viscosity index and pour point. It is understood that other methacrylate ester polymers of the foregoing type can be employed.

A dispersant is generally present in the automatic transmission fluid. An effective dispersant comprises a composition resulting from mixing a substituted succinic compound, selected from the class consisting of substituted succinic acids having the formula:

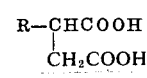

and substituted succinic anhydrides having the formula:

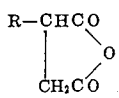

in which R is a large substantially aliphatic hydrocarbon radical having from about 50 to 200 carbon atoms with at least about one-half of a molar equivalent amount of a polyethylene polyamine and, in the case of the acid, heating the resultant mixture to effect acylation and remove the water formed thereby. The anhydride, however, may react without external heating and hence may be heated only if further reactions of the intermediate amic acid are desired. Suitable amines are diethylene triamine, triethylene tetramine, tetraethylene pentamine and amino-alkylated heterocyclic compounds. The reaction involves amidation of a dicarboxylic acid or anhydride thereof with a polymer to produce amino-substituted acyclic diamides, amic acids, polymeric amides, or a combination of these types of products. It will be noted that the amide groups may further react to form imide groups in the process.

Equivalents here means that a minimum of one-half mole of alkenylsuccinic anhydride or acid per mole of amine is required. This would be the least amount of acid which could react with all of the amine added (via amic acid or acyclic polyamide formation). The maximum amount of acid or anhydride possible to react is one-half mole per primary or secondary amino group. Generally, 1 or 2 moles of acid or anhydride per mole of amine, regardless of the total number of nitrogen atoms, is preferred. The reaction product is effective in amounts ranging from about 0.25 to 5.0 weight percent. Methods for preparing the polyethylene polyamine reaction products are well known and have been described in U.S. Pats. Nos. 3,131,150 and 3,172,892.

An amine anti-oxidant is important in this fully formulated transmission fluid. Effective anti-oxidants are the aryl-substituted amine anti-oxidants exemplified by the phenyl naphthyl amines, phenylene diamine, phenothiazine and diphenylamine. A particularly preferred anti-oxidant is phenyl alpha naphthylamine. The anti-oxidants are effective in a concentration ranging from about 0.1 to 2.5 weight percent.

A zinc di(alkylphenoxypolyalkoxyalkyl)dithiophosphate is a valuable component of a fully formulated automatic transmission fluid. This compound is represented by the formula:

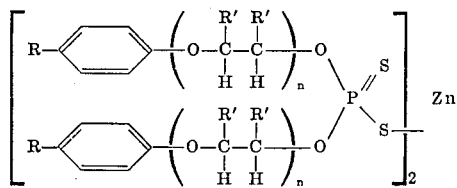

in which R represents an aliphatic radical having from six to 15 carbon atoms, R' is hydrogen or an alkyl radical having from one to four carbon atoms and n is an integer from 1 to 10. Particularly effective compounds in this class are the zinc di(nonylphenoxyethyl) dithiophosphate, zinc di(dodecylphenoxyethyl) dithiophosphate and zinc di(nonylphenoxyethoxyethyl) dithiophosphate. Zinc di(nonylphenoxyethyl) dithiophosphate is prepared by reacting a nonylphenol-ethylene oxide compound with phosphorus pentasulfide followed by neutralization of the acid formed with a basic zinc compound, such as zinc carbonate, zinc oxide or zinc hydroxide. The general preparation of the compounds in this class is disclosed in U.S. Pat. No. 2,344,395 and 3,293,181. In use, it is convenient to prepare a mineral oil solution of the zinc di($C_{6-15}$ alkylphenoxypolyalkoxyalkyl) dithiophosphate containing from 50 to 75 weight percent of the zinc salt. The salts are effective oxidation and corrosion inhibitors for automatic transmission fluids when employed in a concentration ranging from about 0.1 to 5.0 weight percent based on the hydraulic fluid.

Anti-foam agents are conventionally employed in hydraulic fluids because the fluids are rapidly circulated in operation and air can be entrapped. For this purpose, a silicone fluid of high viscosity, such as a dimethyl silicone polymer having a kinematic viscosity of 25°C. of about 1,000 centistokes and above is preferably employed. A very satisfactory anti-foam agent for this purpose is prepared by diluting 10 grams of a dimethyl silicone polymer (1,000 centistokes at 25°C.) with kerosene to provide a solution of 100 cubic centimeters. From 0.005 to 0.025 percent by weight of this concentrate is generally employed in the hydraulic fluid to provide from 50 to 200 parts per million of the silicone polymer based on the hydraulic fluid composition.

The frictional effects of the n-alkanephosphonate salts of the invention on a mineral lubricating oil was determined in a Low Velocity Friction Test. This test was conducted using a General Motors type friction surface, namely a test plate identical in composition to Borg Warner's SD-715 clutch plates, in sliding contact with steel. The coefficients of friction were determined at decreasing sliding speeds, i.e. from about 40 ft./min. down to about 1 ft/min. and also under "break away" conditions. The test temperature used is 250°F. and the applied load is 120 psi.

The base oil employed in the tests flow was a paraffin base mineral oil that had been solvent refined and solvent dewaxed and had an SUS viscosity at 100°F. of about 100 designated Base Oil A. A dispersant comprising the reaction product of tetraethylene pentamine and alkenyl succinic anhydride in which the alkenyl radical had an average molecular weight of 1,200 (described in U.S. Pat. No. 3,172,892) is commonly added to the base oil as indicated in the examples. The coefficients of friction for the various blends at different sliding velocities are set forth in the table below:

TABLE I

Low Velocity Friction Test

| Runs | Base Oil A plus Wt. % of Salt of Alkane Phosphonic Acid | Coefficient of Friction Sliding Velocity, Ft/Min. | |
|---|---|---|---|
| | | 40ft/min | 1.0ft/min |
| 1. | Base Oil A alone | 0.130 | 0.204 |
| 2. | Base Oil + 0.2% Zinc salt of Example I (a) | 0.122 | 0.078 |
| 3. | Base Oil + 0.2% Mg salt of Example II (a) | 0.149 | 0.152 |
| 4. | Base Oil + 0.185% Zinc salt of Example III (b) | 0.128 | 0.084 |

(a) The additive containing oil also contained 2.5 wt. % of a detergent-dispersant prepared from reacting approximately equal mole amounts of tetraethylene pentamine and alkenylsuccinic anhydride in which the alkenyl radical is an approximately 1200 polybutene.

(b) The additive containing oil also contained 1.2 wt. percent of the detergent-dispersant defined in (a), in the form of the complexation product, Example IV.

Runs 2 and 4 show that the coefficient of friction of these blends was sharply reduced as the sliding velocity approached O, a desirable property for smooth shifting in automatic transmissions. In contrast, the coefficient of friction of the Base Oil alone and of the oil containing the magnesium salt of an alkane phosphonate increased substantially as the sliding velocity approached O, a characteristic which causes unacceptably harsh shifting in automatic transmissions.

A number of automatic transmission formulations were prepared to further illustrate the fluids of the invention. The base oil employed in preparing these fluids was a mixture of oils comprising 61 percent of a furfural-refined, acid-treated, clay-contacted, solvent-dewaxed, paraffin base distillate having an SUS at 100°F. of 100; a viscosity index about 100, a flash above 385°F. and a pour below +10°F., 9.0 percent of an acid-treated naphthenic base distillate having an SUS at 100°F. of 60, a flash above 300°F. and a pour below −40°F. and 20 percent of a paraffin base residuum which has been propane-deasphalted, solvent-dewaxed and clay-contacted and which had an SUS viscosity at 210°F. of 160, a flash of about 540°F. and a pour below 5°F. This base oil mixture had a flash above 375°F., a pour below 0°F. and a viscosity index of about 93.

A base oil blend was prepared comprising the above-described base oil mixture and the following additives. The blend contained 4.0 weight percent of an oil concentrate containing about 35 percent of a basic amino nitrogen-containing addition type copolymer comprising copolymers of butyl, lauryl, stearyl and dimethyl aminoethyl methacrylates in approximately 21:53:22:4 weight ratios (as described in U.S. Pat. No. 2,737,496); 3.9 weight percent of an oil concentrate containing about 25 percent of the reaction product of approximately 1:1 mole ratio of tetraethylene pentamine and alkenyl succinic anhydride in which the alkenyl radical is polybutene of approximately 1200 average molecular weight (U.S. Pat. No. 3,172,892); 0.6 weight percent of phenyl alpha naphthylamine and 1.25 weight percent of an oil concentrate containing about 68 percent of zinc di(nonyl-phenoxyethyl) dithiophosphate, this blend being designated Base Blend B.

The fully formulated transmission fluids were prepared from the above-described Base Blend B. These fluids were tested in the Low Velocity Friction Test with the results as set forth in Table II below:

TABLE II

Low Velocity Friction Test

| Runs | Base Oil plus Wt. % of Friction Modifier | Coefficient of Friction Sliding Velocity, Ft./Min. | |
|---|---|---|---|
| | | 40ft/min | 1.0ft/min |
| 5. | Base Blend B alone | 0.159 | 0.183 |
| 6. | Base Blend B + 0.12% of N-n-C$_{18}$-alkyl-propane-1,3-diamine | 0.153 | 0.158 |
| 7. | Base Blend B + 0.22% of the amine salt of Example V | 0.137 | 0.119 |
| 8. | Base Blend B + 0.24% of the amine salt of Example VI | 0.147 | 0.116 |

Runs 7 and 8 in the above table show that fully formulated automatic transmission fluids containing amine salts of alkanephosphonic acids, as defined above, very substantially reduce the coefficient of friction as the sliding velocity approaches zero to provide outstanding smooth shifting in an automatic transmission fluid.

I claim:

1. A method for operating an automatic transmission mechanism having clutch plates which comprises supplying to said automatic transmission a lubricating oil composition characterized by substantially reducing the coefficient of friction at the clutch plates at decreasing sliding speeds between said clutch plates and effective to promote smooth shifting comprising at least 86 weight percent of a mineral lubricating oil, from 0.25 to 5.0 weight percent of a dispersant which is the reaction product of a succinic compound and at least one-half equivalent amount of a polyethylene polyamine, said succinic compound being represented by the formula:

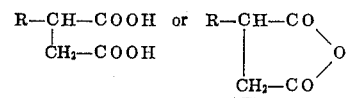

in which R is a substantially aliphatic hydrocarbon radical having from about 50 to 200 carbon atoms and said polyethylene polyamine is selected from the group consisting of diethylene triamine, triethylene tetramine and tetraethylene pentamine, and from about 0.01 to 5.0 weight percent of an n-alkane phosphonic acid salt represented by the formula:

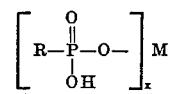

in which R is a straight chain alkyl radical having from about 11 to 40 carbon atoms, M is zinc, calcium or an alkyl ammonium radical having the formula:

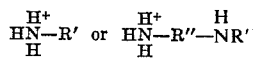

in which R'' is a polymethylene radical having from two to four carbon atoms, R' is an alkyl radical having from six to 20 carbon atoms and x is 1 or 2 equal to the valence of M.

2. A lubricating oil composition for an automatic transmission characterized by substantially reducing the coefficient of friction at the clutch plates at decreasing sliding speeds between the clutch plates and effective to promote smooth shifting comprising at least 86 weight percent of a mineral lubricating oil, from 0.25 to 5.0 weight percent of a dispersant which is the reaction product of a succinic compound and at least one-half equivalent amount of a polyethylene polyamine, said succinic compound being represented by the formula:

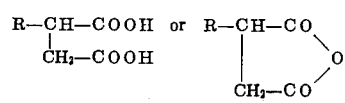

in which R is a substantially aliphatic hydrocarbon radical having from about 50 to 200 carbon atoms and said polyethylene polyamine is selected from the group consisting of diethylene triamine, triethylene tetramine and tetraethylene pentamine, and from about 0.01 to 5.0 weight percent of an n-alkanephosphonic acid salt represented by the formula:

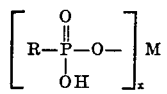

in which R is a straight chain alkyl radical having from about 11 to 40 carbon atoms, M is zinc, calcium or an alkyl ammonium radical having the formula:

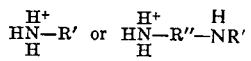

in which R'' is a polymethylene radical having from two to four carbon atoms, R' is an alkyl radical having from six to 20 carbon atoms and $x$ is 1 to 2 equal to the valence of M.

3. A composition according to claim 2 in which the alkyl radical contains from 12 to 18 carbon atoms.

4. A composition according to claim 2 in which the alkyl radical contains from 12 to 14 carbon atoms.

5. A composition according to claim 2 in which said mineral lubricating oil comprises 61 percent of a furfural refined, acid-treated, clay-contacted, solvent-dewaxed, paraffin base distillate having an SUS at 100°F. of 100, a viscosity index about 100, a flash above 380°F. and a pour below about +10°F., 9.0 percent of acid-treated naphthenic based distillate having an SUS at 100°F. of 60, a flash above 300°F. and a pour below −40°F., and 20 percent of a paraffin base residuum which has been propane-deasphalted, centrifuged-dewaxed and clay-treated and has an SUS viscosity at 210°F. of about 160, a flash above 530°F. and a pour of +5°F.

6. A composition according to claim 2 in which said salt is zinc n-tetradecanephosphonic acid.

7. A composition according to claim 2 in which said salt is zinc n-octadecanephosphonic acid.

8. A composition according to claim 2 in which the R in said alkanephosphonic acid salt is an n-$C_{11}$–$C_{14}$ alkyl radical.

9. A composition according to claim 2 containing from 0.5 to 8.0 weight percent of a viscosity index improving polymer of mixed alkyl esters of methacrylic acid having a molecular weight in the range from 25,000 to 1,250,000, from 0.1 to 5 weight percent of (a) an anti-oxidant and corrosion inhibiting zinc dialkylphenoxyalkyl dithiophosphate and from about 0.1 to 2.5 weight percent of an anti-oxidant arylsubstituted alpha naphthylamine.

* * * * *